United States Patent Office 3,600,263
Patented Aug. 17, 1971

3,600,263
METAL CLAD LAMINATES
Theodore W. Lapitz, Jr., La Crosse, Wis., assignor to Universal Oil Products Company, Des Plaines, Ill.
No Drawing Filed Aug. 13, 1969, Ser. No. 849,884
Int. Cl. B32b *15/08;* H05k *1/00*
U.S. Cl. 161—93                                6 Claims

ABSTRACT OF THE DISCLOSURE

Metal clad laminate prepared by heat pressing (1) a "B" stage insulate comprising epoxy resin bonded to a filler in a dicyandiamide-benzyldimethylamine curing system and (2) metal component with (3) a thin film of thermoplastic polymeric composition disposed between said insulate and said metal component.

BACKGROUND

Metal clad laminates are desired for use in various industries. For example, copper clad laminates are widely used in the electrical and electronics industries as circuit boards in radios, television sets, computers, missile guidance systems, etc. In general, these laminates are prepared by first forming an insulate by impregnating or coating a filler material with a thermosetting resin and then pressing at elevated temperature one or more plys of the impregnated filler material with one or more plys of copper foil.

In addition to the other problems associated with the preparation of a laminate of satisfactory quality, a difficult problem is the brown staining encountered in using certain curing systems. This brown staining is referred to as "copper staining" in the laminate industry and prevents the laminate from passing the color specifications.

DESCRIPTION

A novel method has been discovered to avoid the staining problem described above and also to improve the quality of the laminate to meet other severe requirements. This is accomplished in accordance with the present invention by interdisposing a thin thermoplastic film between the copper component and the insulate material and then subjecting the layers to heat pressing.

Any suitable filler material is used in preparing the insulate and, in a preferred embodiment, comprises glass cloth. Other filler materials may comprise fabric including canvas, linen, cotton, nylon, etc, paper, cardboard, etc. However, when used in circuitry, glass cloth is particularly preferred because of its insulation properties.

In preparing the insulate, epoxy resin is of advantage for use as the thermosetting resin. A particularly preferred curing system for bonding the epoxy resin to the glass cloth comprises a mixture of dicyandiamine, referred to as dicy, and benzyldimethylamine, referred to as B.D.M.A. This curing system offers advantages in cost, resin quality, color, ease of fabricating and "B" stage stability. The "B" stage or prepreg is the partially cured epoxy resin bonded to the glass cloth, at which stage the prepreg is tack free. However, as hereinbefore set forth, copper staining occurs when the prepreg is used in conventional manner to prepare the laminate.

In a preferred method, the impregnating solution of epoxy resin, dicyandiamide, benzyldimethylamine and solvent is prepared, generally in a suitable trough. Conventional solvents are used and may comprise one or more of ketone and particularly acetone, methylcellosolve, dimethylformamide, etc. The glass cloth is supplied from a roll and is passed through the impregnating solution, where it is coated to the desired degree, which generally will comprise about 50% but may vary from about 25% to about 75% by weight. The impregnated glass cloth then is passed through a drying chamber, which is heated at a temperature of from about 250° to about 350° F. and preferably from about 290° to about 320° F., during which partial curing occurs to form a tack free product. This step is referred to as the "B" stage and also is referred to in the laminating trade as "treating." After treating, the impregnated cloth is cut into smaller sizes of desired dimensions which are then assembled to form a laminate.

In prior methods, forming of the laminate was accomplished by heat pressing one or more plys of the impregnated cloth and one or more plys of the metal component. As hereinbefore set forth, this method has resulted in copper staining and is avoided in accordance with the present invention by interdisposing a thin layer of a thermoplastic polymer between the metal and the impregnated cloth.

Any suitable thermoplastic polymer may be used in accordance with the present invention. In a particularly preferred method, the thermoplastic polymer is an ionic polymeric material which is available commercially under the trade name of Surlyn A. In general the ionic polymeric material is a polymeric reaction product of an alpha olefin and an alpha, beta-ethylenic carboxylic acid, which is neutralized at least in part by alkali metal ions. A specific material is an ethylene methacrylic acid copolymer in which at least 10% of the carboxylic acid has been neutralized by sodium ions introduced as sodium methoxide. As mentioned above, this thermoplastic material is available commercially and the preparation thereof is described in patents and elsewhere. While the ionic thermoplastic is preferred, it is understood that other suitable thermoplastic polymers may be used. Other thermoplastic polymers comprise polyolefin, polyester, polyether, polyurethane, acrylic and various modified thermoplastic compositions thereof. Here again, these thermoplastic materials are available commercially and the preparation thereof are well known in the art.

In preparing the laminate, a thin film of the thermoplastic is interdisposed between the metal foil and the impregnated cloth. The thin film in general will be of a thickness of less than about 5 mils and more generally of from about 1 to about 2 mil thickness. The thermoplastic film has a softening point of below the temperature at which the assembly is compressed.

Forming the laminate is accomplished by forming an assembly of a single layer each of copper foil, thermoplastic film and epoxy impregnated glass cloth, and then heat pressing the same. When desired, additional plys of copper foil and epoxy impregnated glass cloth may be used, always with a layer of the thermoplastic film between the copper foil and the impregnated glass cloth. The assembly is placed between two stainless steel caul plates and pressed under heat and pressure for the desired time. The temperature will vary with the particular assembly and may range from about 250° to about 500° F. and preferably from about 300° to about 400° F., at a pressure of from about 200 to about 1000 p.s.i. and preferably from about 400 to about 600 p.s.i. The time of pressing may range from about ½ to about 2 hours or more and preferably from about ¾ to about 1½ hours. After heating, the assembly is cooled to about room temperature, preferably under pressure, after which the pressure is released, and the press is opened and the laminate is removed from the caul plates. It is understood that commercial operations may entail the simultaneous compressing of multiple assemblies, each assembly contained between a pair of caul plates.

While the features of the present invention are particularly applicable for the preparation of copper clad laminates, it is understood that the invention may be used in preparing other metal clad laminates. The other metals may be selected from aluminum, chromium, magnesium, nickel, calcium, tin, zinc, etc. and also includes noble metals as silver, gold, etc.

The following examples are introduced to illustrate further the novelty and utility of the present invention but not with the intention of unduly limiting the same.

EXAMPLE I

The epoxy impregnated glass cloth prepreg was prepared in the manner hereinbefore described. A 0.0015 inch thick thermoplastic film (Surlyn A, #1650) was placed between the epoxy coated glass cloth and 1 oz. electrolytic copper foil. The assembly then was placed between stainless steel caul plates and pressed at a temperature to about 360° F. and a pressure of about 500 pounds for about 1 hour. Upon cooling the pressure was released and the laminate was removed from the caul plates.

Tests were conducted on the laminates and particularly for copper staining. The laminate, after etching off the copper, had no evidence of staining and was very clear in color. Furthermore the laminate underwent less weave transfer than observed in conventional laminates. The laminates appear to be more flexible.

EXAMPLE II

Another laminate is prepared in substantially the same manner as described in Example I except that a 1 mil thick polyolefin plastic is inserted between the epoxy prepreg and the copper foil. The assembly then is pressed in conventional manner and produces a laminate of improved properties.

EXAMPLE III

A laminate is prepared in a similar manner except that the thermoplastic polymer is polyurethane. The polyurethane is used as a thin polymer of 2 mil thickness interdisposed between the copper foil and the epoxy impregnated glass cloth.

I claim as my invention:

1. Metal clad laminate prepared by heat pressing (1) a "B" stage insulate comprising epoxy resin bonded to a filler in a dicyandiamide-benzyldimethylamine curing system and (2) metal component with (3) a thin film of thermoplastic polymeric composition disposed between said insulate and said metal component.

2. The laminate of claim 1 in which said metal is copper.

3. The laminate of claim 1 in which said filler is glass cloth.

4. The laminate of claim 1 in which said thermoplastic polymeric composition is an ionic polyolefin.

5. The laminate of claim 1 in which said thermoplastic polymeric composition is a polyolefin.

6. The laminate of claim 1 being a copper clad laminate prepared by heat pressing said "B" stage insulate to copper foil with a thin film of ionic polymer thermoplastic disposed between said insulate and said copper foil.

References Cited

UNITED STATES PATENTS

| | | | |
|---|---|---|---|
| 3,039,904 | 6/1962 | Stage | 161—214X |
| 3,186,898 | 6/1965 | Melink | 161—214 |
| 3,228,091 | 1/1966 | Rice et al. | 174—78.5X |
| 3,294,748 | 12/1966 | Rogers et al. | 161—185X |
| 3,340,606 | 9/1967 | Anderson | 174—68.5X |
| 3,384,957 | 5/1968 | Shannon | 156—3X |
| 3,473,993 | 10/1969 | Kepple et al. | 161—93X |
| 3,477,900 | 11/1969 | Soukup et al. | 161—214X |

ROBERT F. BURNETT, Primary Examiner

R. L. MAY, Assistant Examiner

U.S. Cl. X.R.

156—306; 161—95, 214, 216; 174—68.5